United States Patent
Auvinen et al.

(10) Patent No.: US 9,278,861 B2
(45) Date of Patent: Mar. 8, 2016

(54) METHOD OF SURFACING METALLIC NANOPARTICLES WITH CARBON

(76) Inventors: Ari Auvinen, Espoo (FI); Jorma Jokiniemi, Espoo (FI); Johanna Forsman, Espoo (FI); Pipsa Mattila, Espoo (FI); Unto Tapper, Espoo (FI)

( * ) Notice: Subject to any disclaimer, the term of this patent is extended or adjusted under 35 U.S.C. 154(b) by 434 days.

(21) Appl. No.: 13/512,889

(22) PCT Filed: Dec. 14, 2010

(86) PCT No.: PCT/FI2010/051029
§ 371 (c)(1),
(2), (4) Date: Sep. 27, 2012

(87) PCT Pub. No.: WO2011/073514
PCT Pub. Date: Jun. 23, 2011

(65) Prior Publication Data
US 2013/0009089 A1    Jan. 10, 2013

(30) Foreign Application Priority Data
Dec. 14, 2009    (FI) ..................................... 20096317

(51) Int. Cl.
| C23C 16/00 | (2006.01) |
| C01B 31/02 | (2006.01) |
| B22F 1/00 | (2006.01) |
| B22F 1/02 | (2006.01) |
| B22F 9/28 | (2006.01) |
| B82Y 30/00 | (2011.01) |
| B82Y 40/00 | (2011.01) |
| B05D 7/00 | (2006.01) |

(52) U.S. Cl.
CPC .............. *C01B 31/02* (2013.01); *B22F 1/0018* (2013.01); *B22F 1/02* (2013.01); *B22F 9/28* (2013.01); *B82Y 30/00* (2013.01); *B82Y 40/00* (2013.01); *C01B 31/0226* (2013.01); *C01B 31/0233* (2013.01)

(58) Field of Classification Search
CPC ........ C23C 16/00; C23C 16/26; C23C 16/22; B01J 2/006; B82Y 40/00
USPC ............................ 427/248.1, 249.1, 212, 220
See application file for complete search history.

(56) References Cited

U.S. PATENT DOCUMENTS

2009/0242826 A1* 10/2009 Harada et al. .............. 252/62.55

FOREIGN PATENT DOCUMENTS

| JP | 2005/008960 | 1/2005 |
| JP | 2005008960 A * | 1/2005 |
| WO | WO 2011/073514 | 6/2011 |

OTHER PUBLICATIONS

Athanassiou et al. Large-scale production of carbon-coated copper nanoparticles for sensor applications, Nanotechnology, 17 (2006) 1668-1673.*
Forsman et al. Production of cobalt and nickel particles by hydrogen reduction J. Nanopart. Res 10 (2008, published online Oct. 2007) 10, pp. 745-749.*
Auvinen, A. Magia; "Magnetic Nanoparticles for Ink Applications, In: Research and Development Activities in Printed Intelligence"; Mar. 16, 2009.
Grass, et al.; "Covalently funcionalized cobalt nanoparticles as a platform for magnetic separations in organic synthesis"; Angew. Chem. Int. Ed. 2007. 46, pp. 4909-4912.
Grass, et al.; "Gas phase synthesis of fee-cobalt nanoparticles"; Mater. Chem., 2006, vol. 16; pp. 1825-1830.
Koskela, et al,; "Synthesis of cobalt nanoparticles to enhance magnetic permeability of metal-polymer composites"; Advanced Powder Technology, Sep. 29, 2010.
Luechinger, et al.; "Graphene-stabilized copper nanoparticles as an air-stable substitute for silver and gold in low-cost ink-jet printable electronics"; Nanotechnology, 2008, vol. 19., pp. 1-6.

* cited by examiner

Primary Examiner — Kelly M Gambetta

(57) ABSTRACT

The invention relates to a method for the carbon coating of metallic nanoparticles. The metallic nanoparticles, which are produced using the metal-salt hydrogen-reduction method, can be coated with carbon by adding a hydrocarbon (for example, ethylene, ethane, or acetylene) to the hydrogen using in the synthesis. The carbon layer protects the metallic particles from oxidation, which greatly facilitates the handling and further processing of the particles. By altering the concentration of the hydrocarbon, it is possible, in addition, to influence the size of the metallic particles created, because the coating takes place simultaneously with the creation of the particles, thus stopping the growth process. A carbon coating at most two graphene layers thick behaves like a semiconductor. As a thicker layer, the coating is a conductor. If the hydrocarbon concentration is further increased, a metal-CNT composite material is formed in the process. The composite materials developed are in themselves suitable as the raw materials of, for example, metallic inks and sensor materials.

19 Claims, No Drawings

METHOD OF SURFACING METALLIC NANOPARTICLES WITH CARBON

FIELD OF INVENTION

The invention relates to a method for coating metallic nanoparticles with carbon.

The invention also relates to a method for manufacturing carbon-coated metallic nanoparticles.

BACKGROUND OF THE INVENTION

Three major problems are associated with the production and use of metallic nanoparticles. The particles oxidize very readily, which greatly hinders the handling and storage of the material. If the material is stored as a dry powder, the nanoparticles rapidly sinter together. For this reason, the particles are, almost without exception, collected and stored in liquids. The liquid dispersions in turn typically contain surface-active substances, which keep the nanoparticles separate, but which are at the same time impurities that restrict their use. The size of the particles produced also tends to increase, if the production volume is increased.

One known solutions is disclosed in WO publication WO2007/144455, in which metallic nanoparticles are produced continuously by vaporizing metal salts and then reducing using hydrogen. The method is used to manufacture metal nanoparticles, but these are not coated.

Carbon-coated metallic nanoparticles are produced on a small scale using experimental flame reactors. As far as is known, the reactors in question can be used for short periods at a time, due to which the price of the material produced is very high. The particles produced by the combustion process typically also contain a considerable number of impurities, due to an attempt to keep the price of the basic materials low.

SUMMARY OF THE INVENTION

The present invention is intended to create a method for coating metallic nanoparticles with carbon. The invention is also intended to create a new method for producing coated nanoparticles containing metal.

According to the invention, the particles are coated in the same process as that in which the particles are formed, so that, in practice, the coating of the particles takes place simultaneously with the production of the particles.

The carbon coating, which takes place simultaneously with the formation of the particles, solves, among other things, the problem associated with the growth of the particles produced that takes place when the production volume is increased.

DETAILED DESCRIPTION OF EXEMPLARY EMBODIMENTS

Particles produced using the hydrogen-reduction method are created, when metallic chloride vapour reacts with hydrogen at a relatively low temperature to form metal and hydrogen chloride. The hydrogen chloride created evaporates rapidly from the surface of the particles, but nevertheless limits the speed of growth of the particles, especially if the metallic-chloride content is high. If a hydrocarbon is mixed with hydrogen, it will also react with metallic chloride and particles, producing carbon on the surfaces of the particles created. The numerical concentration of the particles created is very great even before the formation of the carbon layer, because the diffusion speed of the hydrogen is considerably higher than that of the hydrocarbon. The carbon layer does not vaporize and thus limits the growth of the particles considerably more effectively than hydrogen chloride. The agglomeration of the particles is also very rapid immediately after their creation. The coating should therefore take place at the same time as the creation process of the particles, if it is wished to avoid the future sintering of the material. Short hydrocarbons, such as ethylene, which contain relatively little hydrogen, act as the best source of carbon. In that case, impurities will not enter the process, in addition to carbon. Heavier hydrocarbons can also be used, especially if the reactor temperature is high. Thanks to the slower reaction speed, the dirtying of the reactor will then be avoided.

The invention includes a carbon-coating method for metallic nanoparticles, which can be implemented using a processing device for metallic particles, an embodiment of which is disclosed in WO publication 2007/144455, which is incorporated herein by reference. In the publication, metallic particles are produced continuously by vaporizing metal salts and then by reducing using hydrogen.

In the present invention, the coating with carbon of metallic nanoparticles formed in a corresponding manner is implemented by adding a hydrocarbon, such as ethylene, ethane, or acetylene, to the hydrogen gas used in the synthesis. The mixture of hydrocarbon and hydrogen can be fed to the process channel at different point, as well as also by means of a separate feed to the hydrogen flow. The carbon coating can be performed, for example, on cobalt and copper nanoparticles.

One skilled in the art will select the process parameters according to the properties of the basic substances used and the desired end product. If suitable process parameters are sought by experimentation, the parameters described in the embodiments and examples of the aforementioned publication WO 2007/144455 can be used as initial values. In addition to what is described in publication WO 2007/144455, a suitable amount of selected one or more hydrocarbons is fed to the reaction.

The method developed is continuous in operation and the process conditions can be optimized. In addition, the basic substances contain very few impurities and are economical. This keeps production costs lower than those of flame reactors. Compared to flame reactors, the conditions of the production process are very even, the process parameters can be regulated more precisely, and the material produced is more homogeneous.

A process, in which metallic nanoparticles, which are produced by the hydrogen-reduction method form metal salts, and are coated with carbon by adding a hydrocarbon (such as, for example, ethylene, ethane, or acetylene) to the hydrogen used in the synthesis, can be presented as one embodiment. The carbon layer protects the metal particles from oxidation, which greatly facilitates the handling and further processing of the particles. By altering the concentration and composition of the hydrocarbon, it is possible, in addition, to affect the size of the metal particles created, because the coating takes place simultaneously with the creation of the particles, thus stopping the growth process. In agglomerations, the metallic nanoparticles are not in contact with each other, for which reason the material does not sinter when in storage and the particles can be later separated individually. Under certain conditions, the carbon has been shown to form a graphene layer on the surface of the particles. A carbon coating that is at most two graphene layers thick is insulating, so that the composite material will act like a semiconductor. In a thicker layer, the coating will be a conductor. If the hydrocarbon concentration is further increased, a metal-CNT composite material will form in the process. The developed composite materials themselves are suitable as raw materials, for example, for metallic inks and sensor materials.

The carbon layer can also be functionalized, for example, with proteins, carboxyl or amine groups, using known techniques for the carbon nanotube and permitting the development of diverse nanocomposites.

Carbon-coated materials can be used in the manufacture of magnetic inks and polymers. The usability of the material can also be compared with the operation of uncoated metallic nanoparticles.

Carbon-coated copper particles are used, for example, in the manufacture of copper ink.

Carbon-coated copper nanoparticles can also be used as an antimicrobial material in water purification.

Magnetic nanoparticles coated with an electrically non-conductive layer can be used as the cores of coils made on circuit boards. The insulating layer significantly reduces the formation of loss currents, particularly in high-frequency applications.

Magnetic nanoparticles functionalized using polymers and proteins can be used to separate compounds quickly and effectively from liquids. The technique can be applied, for example, in the concentration of impurities (bacteria, viruses, metals, TBT) in drinking or process water, in order to measure their content. The same concentration technique is suitable for medical diagnostics, the manufacture of pharmaceuticals, doping tests, the monitoring of the safety of foodstuffs (dioxins in milk and meat), the separation of noble and heavy metals from water, and possibly in dialysis and cancer therapies. Nowadays, iron-oxide particles mainly in the order of magnitude of several microns are used in magnetic separation techniques. Due to the large size of the particles, their movement in liquids is poor. In addition, iron oxide is clearly a weaker magnet than cobalt, for example. For this reason, magnetic separation can, at present, be performed only from small volumes of liquid using very powerful and expensive magnets.

By pressing a carbon-copper composite, pressure and humidity sensors are made, for the manufacture of which the material is directly suitable.

The embodiments of the invention can vary even widely, within the scope of the set of Claims.

The invention claimed is:

1. A method for forming metallic nanoparticles coated with carbon, comprising:
    evaporating a metal chloride to form a metal chloride vapour; and
    reacting the metal chloride vapour with hydrogen and hydrocarbon to form metal nanoparticles coated with carbon, wherein the metal chloride vapour is reacted with the hydrogen and the hydrocarbon simultaneously.

2. The method according to claim 1, wherein the particles are produced using a hydrogen-reduction method by reacting the metallic chloride vapour with hydrogen at a relatively low temperature to form metal and chloride, in such a way that the hydrogen chloride created vaporizes rapidly from the surface of the particles, but nevertheless substantially limits the speed of growth of the particles, in such a way that the metal-chloride content is high and so that the hydrocarbon is mixed with the hydrogen, when it also reacts with the metal chloride and particles, producing carbon on the surfaces of the particles created.

3. The method according to claim 1 for coating nanoparticles with carbon, wherein the numerical concentration of the particles created is very great already before the formation of the carbon layer, because the speed of diffusion of the hydrogen is considerably higher than that of the hydrocarbon; the carbon layer does not vaporize and limits the growth of the particles thus considerably more effectively than hydrogen chloride, at the same time as the coating takes place simultaneously with the process of creating the particles.

4. The method according to claim 1 for coating nanoparticles with carbon, wherein short hydrocarbons containing relatively little hydrogen act as the best source of carbon.

5. A method for manufacturing carbon-coated metal nanoparticles, the method comprising;
    making metal chloride vapour to react with hydrogen, in order to form metal nanoparticles and hydrogen chloride, and
    introducing hydrocarbon to the reaction while the metal nanoparticles are forming, the hydrocarbon reacting with the metal particles and forming carbon on the surfaces of the metal nanoparticles being formed.

6. The method according to claim 5, wherein the hydrocarbon is introduced to the reaction and the hydrocarbon reacts with the metal chloride and the metal particles forming carbon on the surfaces of the metal nanoparticles being formed.

7. The method according to claim 5, wherein the hydrocarbon is introduced to the reaction mixed with the hydrogen.

8. The method according to claim 5, wherein the hydrocarbon introduced to the reaction contains at least one of the following: ethylene, ethane, and acetylene.

9. The method according to claim 5, wherein the hydrocarbon introduced to the reaction consists of ethylene, ethane, or acetylene.

10. The method according to claim 5, wherein at least a portion of the carbon formed on the surface of the metallic nanoparticles is graphene.

11. The method according to claim 5, wherein coatings one to two graphene layers thick are formed from carbon on the surfaces of the metallic nanoparticles.

12. A method for manufacturing carbon-coated metal nanoparticles, the method comprising:
    making metal chloride vapour to react with hydrogen, in order to form metal nanoparticles and hydrogen chloride; and
    introducing hydrocarbon to the reaction while the nanoparticles are forming, the hydrocarbon reacting with the metal chloride and the metal particles and forming carbon on the surfaces of the metal nanoparticles being formed.

13. The method according to claim 12, wherein the hydrocarbon is introduced to the reaction mixed with the hydrogen.

14. The method according to claim 12, wherein the hydrocarbon introduced to the reaction contains at least one of the following: ethylene, ethane, and acetylene.

15. The method according to claim 12, wherein the hydrocarbon introduced to the reaction consists of ethylene, ethane, or acetylene.

16. The method according to claim 12, wherein at least a portion of the carbon formed on the surface of the metallic nanoparticles is graphene.

17. The method according to claim 12, wherein coatings one to two graphene layers thick are formed from carbon on the surfaces of the metallic nanoparticles.

18. The method according to claim 12, further comprising limiting the size of the metal nanoparticles by introducing the hydrocarbon to the reaction.

19. The method according to claim 12, further comprising adjusting the size of the metal nanoparticles by changing the composition of the hydrocarbon, the concentration of the hydrocarbon, or both the composition and concentration of the hydrocarbon.

* * * * *